(12) United States Patent
Rix et al.

(10) Patent No.: US 6,393,128 B1
(45) Date of Patent: May 21, 2002

(54) SYSTEM FOR BROADCASTING DATA SIGNALS IN A SECURE MANNER

(75) Inventors: Simon Paul Ashley Rix, Germiston (ZA); Andrew Augustine Wajs, Haarlem (NL)

(73) Assignee: Mindport B. V., Hoofddorp (NL)

( * ) Notice: Subject to any disclaimer, the term of this patent is extended or adjusted under 35 U.S.C. 154(b) by 0 days.

(21) Appl. No.: 09/387,685

(22) Filed: Aug. 31, 1999

(30) Foreign Application Priority Data

Sep. 1, 1998 (EP) ............................................ 98202914

(51) Int. Cl.[7] ................................................. H04L 9/08
(52) U.S. Cl. ...................... 380/283; 380/205; 380/239; 380/242; 380/259; 380/43; 380/283; 380/284; 380/285; 713/172; 713/185
(58) Field of Search ................................ 713/185, 172; 380/285, 284, 283, 43, 259, 242, 239, 205

(56) References Cited

U.S. PATENT DOCUMENTS

| 4,531,020 A | 7/1985 | Wechselberger et al. . 178/22.08 |
| 4,868,877 A | 9/1989 | Fischer ........................ 380/25 |
| 4,887,796 A | 12/1989 | Horne ......................... 380/21 |
| 5,029,207 A | 7/1991 | Gammie ..................... 380/10 |
| 5,054,064 A | 10/1991 | Walker et al. ................. 380/5 |
| 5,159,633 A | 10/1992 | Nakamura .................... 380/30 |
| 5,237,610 A | 8/1993 | Gammie et al. .............. 380/10 |

(List continued on next page.)

FOREIGN PATENT DOCUMENTS

| EP | 0 428 252 A2 | 5/1991 | ........... H04N/7/167 |
| EP | 0 658 054 A2 | 6/1995 | ............ H04N/7/16 |
| EP | 0 689 316 A2 | 12/1995 | ............. H04L/9/32 |
| EP | 0 696 141 A2 | 2/1996 | .......... H04N/7/167 |
| EP | 0 822 720 A1 | 4/1998 | .......... H04N/7/167 |
| WO | WO 97/04553 | 6/1997 | ........... H04L/12/22 |
| WO | WO 97/38530 | 10/1997 | ............ H04N/7/16 |

OTHER PUBLICATIONS

Francoise Coutrot et al., "A Single Conditional Access System for Satellite–Cable and Terrestrial TV", *IEEE Transactions on Consumer Electronics*, vol. 35, No. 3, pp. 464–468, (Aug. 1989).
Andy Trott, "An Enhanced Cost Effective Line Shuffle Scrambling System with Secure Conditional Access Authorization", *NCTA Technical Papers*, pp. 133–143, (Jun. 6, 1993).
EBU Project Group B/CA, "Functional Model of a Conditional Access System", *EBU Technical Review*, No. 266, pp. 64–77, (Winter 1995).
A copy of European Search Report completed on Jan. 22, 1999 (2 pages).

*Primary Examiner*—Albert Decady
*Assistant Examiner*—Todd Jack
(74) *Attorney, Agent, or Firm*—Blakely, Sokoloff, Taylor & Zafman, LLP

(57) ABSTRACT

A system for broadcasting data signals in a secure manner comprises means for encrypting the data signals using a first key, means for broadcasting the encrypted data signals to subscribers, means for decrypting the encrypted data signals at each of the subscribers using the first key, and means for encrypting the first key using a second key. The second key is different for each group of subscribers having a common interest in a type of programs. The system further comprises means for broadcasting the encrypted first key to all subscribers and means for decrypting the encrypted first key at each of the subscribers using the second key. The second key is a combination of a key common to all subscribers and a difference key which is unique per type of programs. Means are provided for encrypting the common key and for broadcasting the encrypted common key to all subscribers, the subscribers having means for decrypting the encrypted common key at each of the subscribers.

37 Claims, 2 Drawing Sheets

U.S. PATENT DOCUMENTS

| | | | |
|---|---|---|---|
| 5,282,249 A | 1/1994 | Cohen et al. | 380/23 |
| 5,420,866 A | 5/1995 | Wasilewski | 370/110.1 |
| 5,600,378 A | 2/1997 | Wasilewski | 348/468 |
| 5,625,693 A | 4/1997 | Rohatgi et al. | 380/23 |
| 5,742,677 A | 4/1998 | Pinder et al. | 380/4 |
| 5,870,474 A | 2/1999 | Wasilewski et al. | 380/21 |
| 6,069,957 A * | 5/2000 | Richards | 380/281 |
| 6,094,487 A * | 6/2000 | Butler et al. | 380/270 |
| 6,118,873 A * | 9/2000 | Lotspiech et al. | 380/277 |

* cited by examiner

SYSTEM FOR BROADCASTING DATA SIGNALS IN A SECURE MANNER

BACKGROUND OF THE INVENTION

The invention relates to a system for broadcasting data signals in a secure manner, comprising means for encrypting the data signals using a first key, means for broadcasting the encrypted data signals to subscribers, means for decrypting the encrypted data signals at each of the subscribers using the first key, means for encrypting the first key using a second key, said second key being different for each group of subscribers having a common interest in a type of programs, means for broadcasting the encrypted first key to all subscribers, means for decrypting the encrypted first key at each of the subscribers using the second key.

Such a system can be used for example in a pay-TV system. A system of this type is disclosed in U.S. Pat. No. 4,531,020. For security reasons it would be desired to change the second key rapidly. In the known system this would however require a large amount of data to be distributed to the subscribers in the system. Distributing a large amount of data for changing the keys reduces the availability of bandwidth for broadcasting program signals and the like. Therefore the second key is changed at a very low rate of each month or even less.

It is an object of the invention to provide a system of the above-mentioned type, wherein the second key can be changed relatively rapidly without requiring the distribution of a large amount of data.

SUMMARY OF THE INVENTION

According to the invention the system of the above-mentioned type is characterised in that said second key is a combination of a key common to all subscribers and a difference key which is unique per type of programs, wherein means are provided for encrypting the common key and for broadcasting the encrypted common key to all subscribers and means for decrypting the encrypted common key at each of the subscribers.

In this manner the second key can be changed very rapidly by changing the common key which is common to all subscribers so that only one key for the complete system needs to be distributed.

Preferably the system comprises means for changing the common key at a relatively high rate.

The system of the invention further shows the advantage that a different key hierarchy can be used for entitlements and security, repectively. At the entitlement level the second key is different for each group of subscribers having a common interest in a specific type of programs, such as sports, film etc. The difference in second keys is obtained by providing different difference keys for each type of program or individual program etc. The security structure however can be structured to eliminate pirate smart cards as soon as possible. According to the invention said means for encrypting and decrypting the common key, respectively, include a chain of encrypting and decrypting means, respectively, each next encrypting and decrypting means operating in a manner common to a smaller number of subscribers.

In this manner the group including the pirated smart card can be found relatively easily.

The invention further provides a system for decrypting encrypted data signals in a broadcasting system with a number of subscribers, comprising means for decrypting the encrypted data signals using a first key, means for decrypting the encrypted first key at each of the subscribers using a second key, said second key being different for each group of subscribers having a common interest in a type of program, characterized in that said second key is a combination of a key common to all subscribers and a difference key which is unique per type of programs, wherein means are provided for decrypting the encrypted common key at each of the subscribers.

BRIEF OF DESCRIPTION OF THE DRAWINGS

The invention will be further explained by reference to the drawings in which two embodiments of the system according to the invention is shown in a very schematical manner.

DESCRIPTION OF THE PREFERRED EMBODIMENTS

Figure 1:
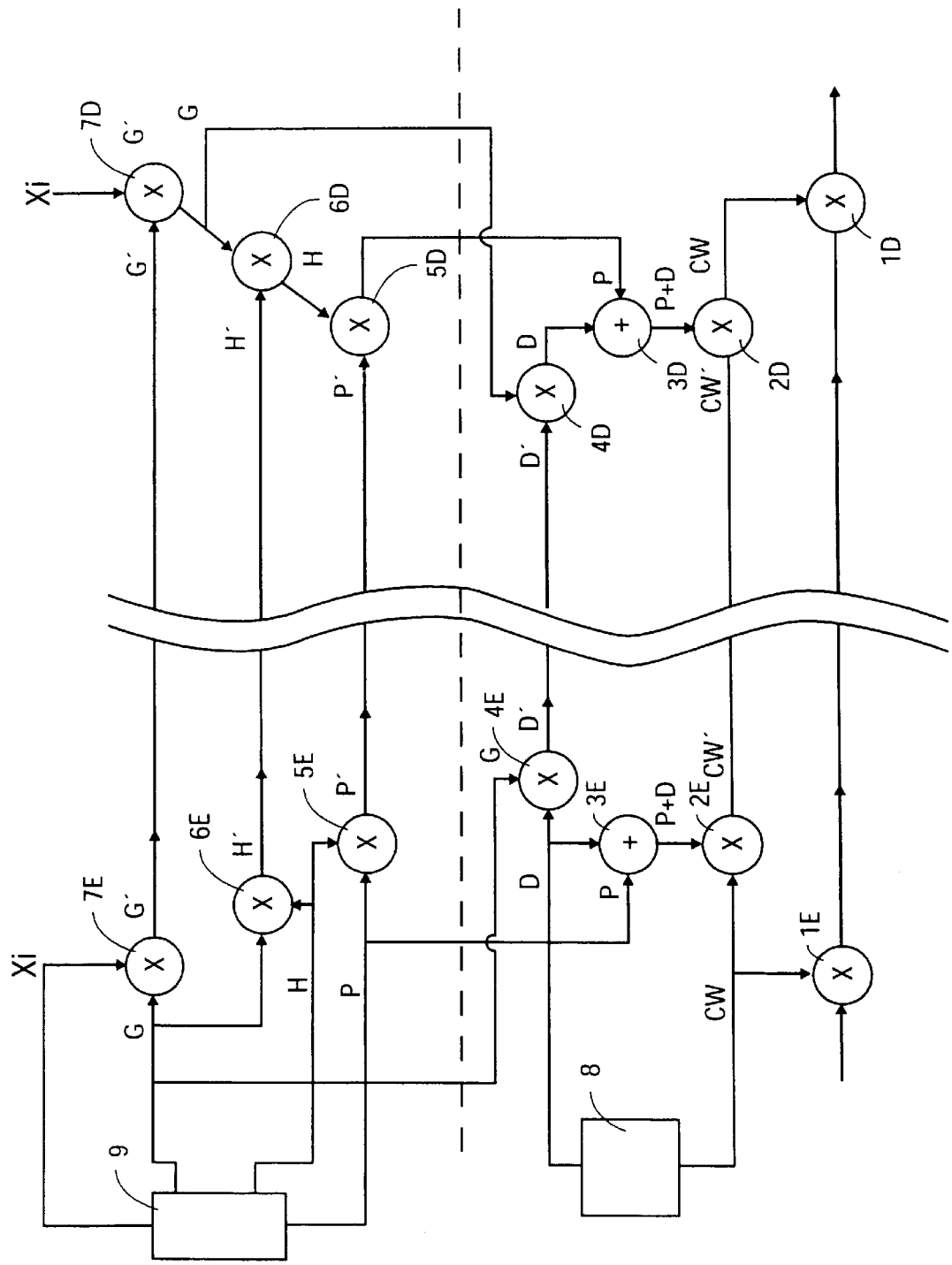
FIG. 1 shows a diagram of a first embodiment of a system for broadcasting data signals according to the invention.

It is observed that in the specification and drawing reference numerals are used with a character E or D added to indicate the encryption and decryption side, respectively. Further P' is used to indicate the encrypted version of P, for example.

Referring to FIG. 1 there is shown in a very schematical way a system for broadcasting data signals in a secure manner. The data to be broadcasted can be a tv-program signal or any other data signal. The data is provided to a first encryptor or encrypting device 1E delivering encrypted data signals encrypted using a first key or control word CW. The encrypted data signals are broadcasted to all subscribers in the system in a manner not further shown. Broadcasting may take place through satellite, antenna, cable or any suitable manner. The control word CW is encrypted in a second encryptor 2E using a second key P+D and the encrypted control word CW' is also broadcasted. The second key P+D is different for each group of subscribers having a common interest in a type of program, such as for example sport programs, films, entertainment and the like. This means that for each different program or each different film for example, a different second key is required. This difference is obtained by combining a common key P which is common to all subscribers in the system, and a difference key D which is unique per type of program. The common key P and the difference key D are combined in a combination device 3E receiving the common key P and a difference key D. The difference key D is also encrypted in an encryptor 4E using a group key G common to a group of subscribers of 256 subscribers, for example. The encrypted difference key D' is also broadcasted.

The common key P is also encrypted in a further encryptor 5E using a key H common to a group of subscribers substantially larger than the number of subscribers having the same group key G. The subscribers using the same key H can be called a super group. The encrypted common key P' is also broadcasted.

At the receiver side, i.e. at each subscriber the encrypted first key CW' is received and decrypted in a decryptor or decrypting device 2D using the second key P+D to obtain the first key CW to decrypt the encrypted data in a decryptor 1D, so that the subscriber can watch the program or film or the like to which he is entitled. The difference key D' is decrypted in a decryptor 4D using the group key G to obtain the difference key D and this difference key is combined with the common key P in the combination device 3D to obtain the second key P+D. The common key P is obtained by decrypting the encrypted common key P' in a decryptor 5D using the super group key H.

As indicated by a dashed line, the system can be seen as being divided in an entitlement section below the dashed line which is structured to manage entitlements, i.e. providing entitlements to the subscribers to watch different type of programs, films and the like. In this section the first key CW is changed rapidly, for example each 10 seconds. The difference key D is changed at a low rate, for example each month.

In the security section, the common key P can also be changed rapidly, for example each 10 seconds, so that the second key required to decrypt the first key CW' actually also is changed at a relatively high rate. In this manner the security of the system is enhanced without the requirement of distributing a large database of the program dependent second keys to all groups of subscribers.

Further, the security section can be structured to eliminate pirate cards as soon as possible. This means that the super group key H used for encrypting and decrypting the common key can be obtained through a chain of encrypting and decrypting devices 6E,7E and 6D,7D, respectively, wherein each next encrypting and decrypting device uses a key which is common to a smaller number of subscribers. This means that each next encrypting and decrypting device operates in a manner common to a smaller number of subscribers. In the embodiment shown, the super group key H is encrypted and decrypted, respectively by encrypting and decrypting devices using the group key G common to a group of 256 subscribers. This group key G is encrypted and decrypted, respectively in encrypting and decrypting devices 7E, 7D using a card key Xi. It is noted that the chain of encrypting and decrypting devices may include more or less levels depending on the overall size of the system for example.

If a pirate card is found, it can be determined quickly in which group of 256 subscribers the card key Xi is located. By changing this one group key G the pirate cards can be switched off.

Figure 2:
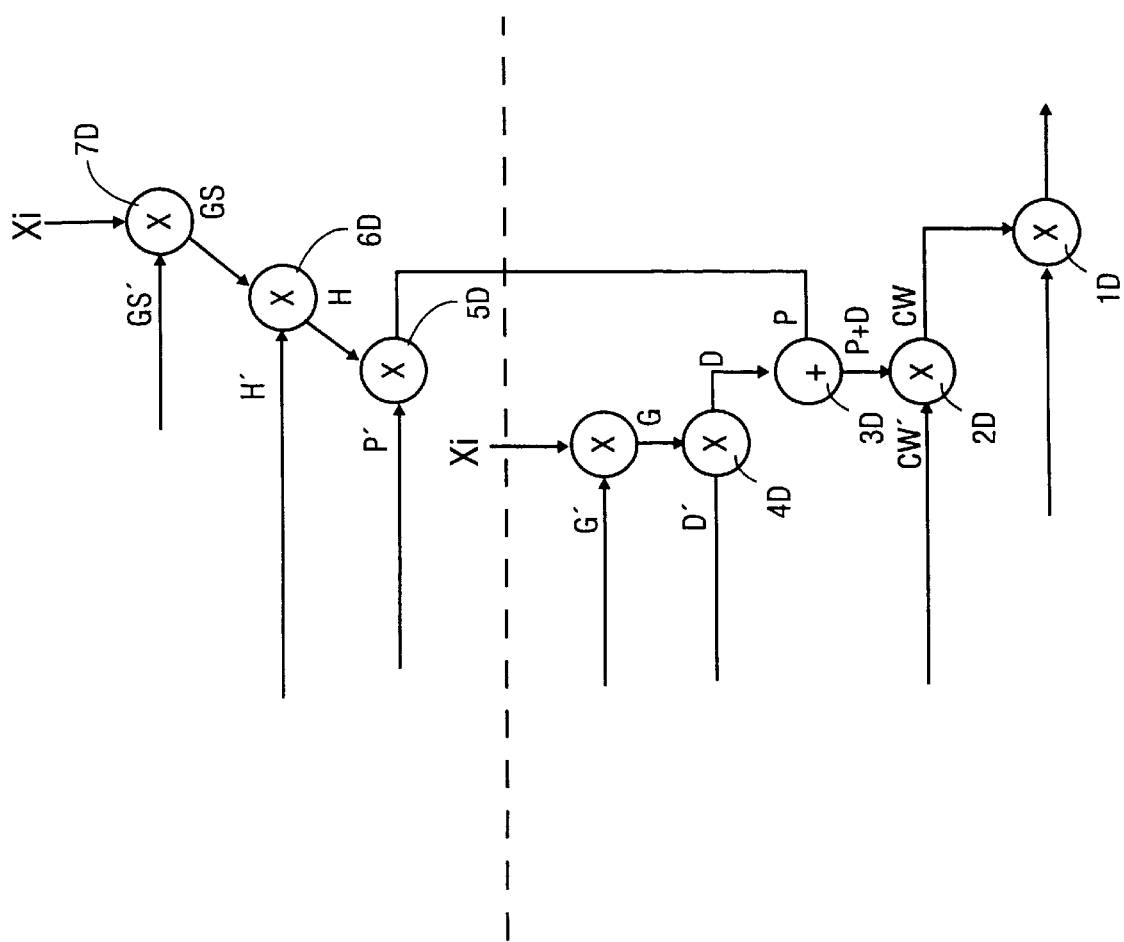
FIG. 2 show a diagram of a second embodiment of a system for decrypting encrypted data signals in a second embodiment of the broadcasting system of the invention.

In the system described above, smart cards can be used having a memory divided in sectors to be used by different service providers. In such a case each service provider operates his own entitlement and security structure. FIG. 2 shows the receiving side at a subscriber in a different embodiment of the system of the invention, wherein when smart cards with several sectors are used, each service provider can use his own entitlement structure using group keys G, second keys combining a common key P and difference keys D, and first keys CW. Separate from this entitlement structure there is a security structure common to all sectors using the same key hierarchy as shown in FIG. 1, wherein however a separate group key GS is used to locate the pirate cards if a pirate card is found.

In the drawings means for providing and changing the first and difference keys CW and D is indicated by a block 8 and means for providing and changing the keys P, H, G and Xi is indicated by a block 9. In practice the keys can be can be generated and changed in any suitable manner. Further, the keys at the subscriber side will generally be stored in a memory. Except for the part described above a conditional access module and decoder known per se can be used by the subscriber.

It is noted that in the above-described systems encryption and decryption algorithms using keys are applied at all levels. However at least with respect to the encryption and decryption of the difference key D and the key H and the algorithm used in the devices 7E, 7D it is also possible to use an encryption algorithm and decryption algorithm which does not use a key. In such a system the algorithm itself need to be changed if for security reasons the operator wishes to use a different algorithm.

Therefore, it will be understood that in the above-described systems any suitable encryption and decryption algorithm either key-based or not, can be used. The invention is not restricted to the use of a specific algorithm. Further, decryption may include any suitable authentication algorithm. The combination function used to combine the keys P and D to obtain the second key P+D can also be any suitable function and is not restricted to merely adding of P and D. Further it will be understood that the encryption and decryption devices can be implemented in any suitable manner, for example by using a microprocessor and suitable software. Therefore, the specific terms "device, encryptor, decryptor, encrypting means and decrypting means" as used in the specification and claims should not be deemed to be limited to physical devices. On the contrary, it will be clear to the skilled person that the encryption and decryption functions can be realized in various manners either in software or hardware.

The invention is not restricted to the above described embodiments which can be varied in a number of ways within the scope of the claims.

What is claimed is:

1. A system for broadcasting data signals in a secure manner, comprising means for encrypting the data signals using a first key, means for broadcasting the encrypted data signals to subscribers, means for decrypting the encrypted data signals at each of the subscribers using the first key, means for encrypting the first key using a second key, said second key being different for each group of subscribers having a common interest in a type of programs, means for broadcasting the encrypted first key to all subscribers, means for decrypting the encrypted first key at each of the subscribers using the second key, characterized in that said second key is a combination of a key common to all subscribers and a difference key which is unique per type of programs, where means are provided for encrypting the common key and for broadcasting the encrypted common key to all subscribers and means for decrypting the encrypted common key at each of the subscribers.

2. The system according to claim 1, comprising means for changing the common key at a relatively high rate.

3. The system according to claim 1, comprising means for changing the difference key at a relatively low rate, means for encrypting the difference key, means for broadcasting the encrypted key and means for decrypting the encrypted difference key at each of the subscribers.

4. The system according to claim 1, wherein said means for encrypting and decrypting the common key, respectively, include a chain of encrypting and decrypting means, respectively, each next encrypting and decrypting means, operating in a manner common to a smaller number of subscribers.

5. The system according to claim 4, wherein a plurality of the encryption and decryption means of the chain uses a key common to a smaller number of subscribers, wherein the first encrypting and decrypting means of the chain, respectively, uses a card key to encrypt and decrypt, respectively, a basic group key.

6. The system according to claim 3, wherein said basic group key is used as a third key by said encrypting and decrypting means for the difference key, respectively.

7. A system for decrypting encrypted data signals in a broadcasting system with a number of subscribers, comprising means for decrypting the encrypted data signals using a first key, means for decrypting the encrypted first key at each of the subscribers using a second key, said second key being different for each group of subscribers having a common interest in a type of programs, characterized in that said second key is a combination of a key common to all subscribers and a difference key which is unique per type of programs, wherein means are provided for decrypting the encrypted common key at each of the subscribers.

8. The system according to claim 7, wherein said means for decrypting the common key includes a chain of decrypting means, each next decrypting means using a key common to a smaller number of subscribers, wherein the first decrypting means of the chain uses a card key to decrypt a group key.

9. The system according to claim 2, comprising means for changing the difference key at a relatively low rate, means for encrypting the difference key, means for broadcasting the encrypted key and means for decrypting the encrypted difference key at each of the subscribers.

10. The system according to claim 2, wherein said means for encrypting and decrypting the common key, respectively, include a chain of encrypting and decrypting means, respectively, each next encrypting and decrypting means, operating in a manner common to a smaller number of subscribers.

11. The system according to claim 3, wherein said means for encrypting and decrypting the common key, respectively, include a chain of encrypting and decrypting means, respectively, each next encrypting and decrypting means, operating in a manner common to a smaller number of subscribers.

12. The system according to claim 9, wherein said means for encrypting and decrypting the common key, respectively, include a chain of encrypting and decrypting means, respectively, each next encrypting and decrypting means, operating in a manner common to a smaller number of subscribers.

13. The system according to claim 5, wherein said basic group key is used as a third key by said encrypting and decrypting means for the difference key, respectively.

14. A system for broadcasting data signals in a secure manner, the system including:
   means for encrypting the data signals using a first key;
   means for broadcasting the encrypted data signals to subscribers; and
   means for encrypting the first key using a second key, said second key being different for each group of subscribers having a common interest in a type of program, and being a combination of a common key common to all subscribers and a difference key that is unique per type of program, and for broadcasting the encrypted first key to all subscribers, so that the encrypted first key is capable of being decrypted at each of the subscribers using the second key; and
   means for encrypting the common key and for broadcasting the encrypted common key to all subscribers for decryption at each of the subscribers.

15. The system according to claim 14, comprising means for changing the common key at a relatively high rate.

16. The system according to claim 14, comprising means for changing the difference key at a relatively low rate, and means for encrypting the difference key.

17. The system according to claim 16, wherein said means for encrypting the common key includes a chain of encrypting means, each next encrypting means of the chain operating in a manner common to a smaller number of subscribers.

18. The system according to claim 17, wherein a plurality of the encryption means of the chain use a key common to a smaller number of subscribers, wherein a first encrypting means of the chain uses a card key to encrypt a basic group key.

19. The system according to claim 18, wherein said basic group key is used as a third key by said encrypting means for the difference key.

20. A system to encrypt data signals, the system including:
   a first encryptor to encrypt the data signals using a first key for broadcast to subscribers;
   a second encryptor to encrypt the first key using a second key, said second key being different for each group of subscribers having a common interest in a type of program, and being a combination of a common key common to all subscribers and a difference key that is unique per type of program, the first key being encrypted for broadcast to all subscribers so that the encrypted first key is capable of being decrypted at each of the subscribers using the second key; and
   a third encryptor to encrypt the common key for broadcast to all subscribers for decryption at each of the subscribers.

21. The system according to claim 20, including a changer to change the common key at a relatively high rate.

22. The system according to claim 20, including a changer to change the difference key at a relatively low rate, and a fourth encryptor to encrypt the difference key.

23. The system according to claim 20, comprising a chain of encryptors, including said third encryptor, each next encryptor of said chain operating in a manner common to a smaller number of subscribers.

24. The system according to claim 23, wherein a plurality of the encryptors of the chain use a key common to a smaller number of subscribers, wherein a primary encryptor of the chain uses a card key to encrypt a basic group key.

25. The system according to claim 24, including a fourth encryptor to encrypt the difference key using said basic group key.

26. A system to decrypt encrypted data signals in a broadcasting system with a number of subscribers, the system including:
   a first decryptor to decrypt the encrypted data signals using a first key,
   a second decryptor to decrypt an encrypted first key to reveal the first key at each of the subscribers using a second key, said second key being different for each group of subscribers having a common interest in a type of program, characterized in that said second key is a combination of a common key common to all subscribers and a difference key which is unique per type of program; and
   a third decryptor to decrypt an encrypted common key to reveal the common key at each of the subscribers.

27. The system according to claim 26, comprising a chain of decryptors, including said third decryptor, each next decryptor of the chain using a key common to a smaller number of subscribers, wherein a primary decryptor of the chain uses a card key to decrypt a group key.

28. The system according to claim 26, wherein said third decryptor to decrypt the encrypted common key includes a chain of decryptors, each next decryptor of the chain operating in a manner common to a smaller number of subscribers.

29. A method to encrypt data signals, the method including:

encrypting the data signals using a first key for broadcast to subscribers;

encrypting the first key using a second key, said second key being different for each group of subscribers having a common interest in a type of program, and being a combination of a common key common to all subscribers and a difference key that is unique per type of program, the first key being encrypted for broadcast to all subscribers so that the encrypted first key is capable of being decrypted at each of the subscribers using the second key; and encrypting the common key for broadcast to all subscribers and for decryption at each of the subscribers.

30. The method according to claim 29, including changing the common key at a relatively high rate.

31. The method according to claim 29, including changing the difference key at a relatively low rate, and encrypting the difference key.

32. The method according to claim 29, including operating a chain of encryptors to encrypt the common key, each next encryptor of said chain operating in a manner common to a smaller number of subscribers.

33. The method according to claim 32, wherein a plurality of the encryptors of the chain use a key common to a smaller number of subscribers, wherein a primary encryptor of the chain uses a card key to encrypt a basic group key.

34. The method according to claim 33, wherein said basic group key is used as a third key to encrypt the difference key.

35. A method to decrypt encrypted data signals in a broadcasting system with a number of subscribers, the method including:

decrypting the encrypted data signals using a first key, decrypting an encrypted first key to reveal the first key at each of the subscribers using a second key, said second key being different for each group of subscribers having a common interest in a type of programs, characterized in that said second key is a combination of a common key common to all subscribers and a difference key which is unique per type of programs; and decrypting an encrypted common key to reveal the common key at each of the subscribers.

36. The method according to claim 35, including operating a chain of decryptors to decrypt the encrypted common key, each next decryptor of the chain using a key common to a smaller number of subscribers, wherein a primary decryptor of the chain uses a card key to decrypt a group key.

37. The method according to claim 35, including operating a chain of decryptors to decrypt the common key, each next decryptor of the chain operating in a manner common to a smaller number of subscribers.

* * * * *